US007717791B2

(12) United States Patent
Gatto et al.

(10) Patent No.: US 7,717,791 B2
(45) Date of Patent: May 18, 2010

(54) METHOD FOR FAULT AND/OR DISASTER TOLERANT CASHLESS GAMING

(75) Inventors: Jean-Marie Gatto, London (GB); Thierry Brunet de Courssou, Henderson, NV (US)

(73) Assignee: IGT, Reno, NV (US)

( * ) Notice: Subject to any disclaimer, the term of this patent is extended or adjusted under 35 U.S.C. 154(b) by 389 days.

(21) Appl. No.: 11/261,303

(22) Filed: Oct. 28, 2005

(65) Prior Publication Data

US 2006/0281554 A1 Dec. 14, 2006

(51) Int. Cl.
*A63F 13/12* (2006.01)

(52) U.S. Cl. ............................ 463/43; 463/29; 463/42; 273/138.2; 273/460; 719/325

(58) Field of Classification Search .................. 463/21, 463/25–27, 29, 40–43, 47; 273/138.1, 139, 273/138.2, 141 A, 454–456, 460; 709/203–207; 714/E11.088, E11.105; 719/325; *A63F 13/00, A63F 13/12*
See application file for complete search history.

(56) References Cited

U.S. PATENT DOCUMENTS

| | | | | |
|---|---|---|---|---|
| 4,636,951 | A * | 1/1987 | Harlick | 463/25 |
| 5,265,874 | A | 11/1993 | Dickinson et al. | |
| 5,290,033 | A | 3/1994 | Bittner et al. | |
| 5,586,937 | A * | 12/1996 | Menashe | 463/41 |
| 5,674,128 | A | 10/1997 | Holch et al. | |
| 5,766,076 | A * | 6/1998 | Pease et al. | 463/27 |
| 5,800,269 | A | 9/1998 | Holch et al. | |
| 5,823,879 | A | 10/1998 | Goldberg et al. | |
| 6,048,269 | A | 4/2000 | Burns et al. | |
| 6,077,163 | A | 6/2000 | Walker et al. | |
| 6,089,982 | A | 7/2000 | Holch et al. | |
| 6,264,558 | B1 * | 7/2001 | Nishiumi et al. | 463/36 |
| 6,280,328 | B1 | 8/2001 | Holch et al. | |
| 6,547,131 | B1 * | 4/2003 | Foodman et al. | 235/380 |
| 6,577,733 | B1 * | 6/2003 | Charrin | 380/251 |
| 6,582,311 | B1 * | 6/2003 | Sugimura | 463/43 |
| 6,585,598 | B2 * | 7/2003 | Nguyen et al. | 463/41 |
| 6,607,441 | B1 * | 8/2003 | Acres | 463/25 |
| 6,749,510 | B2 | 6/2004 | Giobbi | |
| 6,760,829 | B2 * | 7/2004 | Lasserre et al. | 711/207 |

(Continued)

FOREIGN PATENT DOCUMENTS

WO WO 01/41892 A2 6/2001

(Continued)

OTHER PUBLICATIONS

Office Action mailed Jun. 15, 2004 in parent application U.S. Appl. No. 10/163,177, filed Jun. 5, 2002.

(Continued)

*Primary Examiner*—Dmitry Suhol
*Assistant Examiner*—Arthur O. Hall
(74) *Attorney, Agent, or Firm*—Young Law Firm, P.C.

(57) ABSTRACT

Methods and systems that enable cashless gaming dispense with the need to set up and operate a complex centrally controlled system or dispense with the need to distribute expensive smart cards. The patrons' gaming session meters (including, for example, a measure of winning and/or available credit) are distributed amongst an estate of peer networked gaming machines and are stored in redundant storage for fault tolerance.

16 Claims, 6 Drawing Sheets

U.S. PATENT DOCUMENTS

| | | | | |
|---|---|---|---|---|
| 7,089,067 | B2 * | 8/2006 | Nagasaka et al. | 700/19 |
| 7,152,158 | B2 | 12/2006 | Watanabe et al. | |
| 7,363,426 | B2 * | 4/2008 | Ahmadian et al. | 711/114 |
| 7,406,481 | B2 * | 7/2008 | Saha et al. | 707/104.1 |
| 7,464,272 | B2 * | 12/2008 | Danieli | 713/182 |
| 7,523,350 | B2 * | 4/2009 | Lintz et al. | 714/36 |
| 7,618,317 | B2 * | 11/2009 | Jackson | 463/24 |
| 2001/0018728 | A1 * | 8/2001 | Topham et al. | 711/113 |
| 2001/0029205 | A1 | 10/2001 | Taho et al. | |
| 2001/0044339 | A1 * | 11/2001 | Cordero et al. | 463/42 |
| 2002/0026581 | A1 | 2/2002 | Matsuyama et al. | |
| 2002/0122410 | A1 * | 9/2002 | Kulikov et al. | 370/349 |
| 2002/0128056 | A1 * | 9/2002 | Kato | 463/9 |
| 2002/0147040 | A1 | 10/2002 | Walker et al. | |
| 2002/0147044 | A1 * | 10/2002 | Jakobsson et al. | 463/42 |
| 2003/0033255 | A1 | 2/2003 | Burton et al. | |
| 2003/0087698 | A1 * | 5/2003 | Nishiumi et al. | 463/36 |
| 2003/0114217 | A1 * | 6/2003 | Walker et al. | 463/20 |
| 2003/0120723 | A1 * | 6/2003 | Bright et al. | 709/203 |
| 2003/0211881 | A1 | 11/2003 | Walker et al. | |
| 2003/0228907 | A1 | 12/2003 | Gatto et al. | |
| 2004/0039911 | A1 | 2/2004 | Oka et al. | |
| 2004/0053682 | A1 * | 3/2004 | Nelson et al. | 463/25 |
| 2004/0117368 | A1 * | 6/2004 | Saha et al. | 707/6 |
| 2004/0180721 | A1 * | 9/2004 | Rowe | 463/42 |
| 2005/0210323 | A1 * | 9/2005 | Batchelor et al. | 714/14 |
| 2006/0166732 | A1 * | 7/2006 | Lechner et al. | 463/25 |
| 2007/0026935 | A1 * | 2/2007 | Wolf et al. | 463/25 |
| 2007/0026942 | A1 * | 2/2007 | Kinsley et al. | 463/29 |

FOREIGN PATENT DOCUMENTS

| | | |
|---|---|---|
| WO | WO 03/104946 A2 | 3/2003 |

OTHER PUBLICATIONS

International Search Report mailed Jun. 30, 2004, in related International Application No. PCT/US03/09638, filed Mar. 26, 2003.

Written Opinion mailed Aug. 30, 2004, in related International Application No. PCT/US03/09638, filed Mar. 26, 2003.

International Preliminary Examination Report completed Mar. 16, 2005, in related International Application No. PCT/US03/09638, filed Mar. 26, 2003.

Office action of Jun. 1, 2007 in related U.S. Appl. No. 11/112,373.

Office action of Nov. 7, 2007 in related U.S. Appl. No. 11/112,373.

Office action of Jun. 10, 2008 in related U.S. Appl. No. 11/112,373.

Office action of Dec. 4, 2008 in related U.S. Appl. No. 11/112,373.

* cited by examiner

METHOD FOR FAULT AND/OR DISASTER TOLERANT CASHLESS GAMING

CROSS-REFERENCE TO RELATED APPLICATIONS

This application is related in subject matter to Ser. No. 11/112,373, filed Apr. 22, 2005, and Ser. No. 10/163,177, filed Jun. 5, 2002, which applications are hereby incorporated herein by reference in their entireties.

BACKGROUND OF THE INVENTION

1. Field of the Invention

This invention relates generally to the field of pay computer-controlled games, either games of skills or games of chance, and more particularly to the field of cashless gaming systems and methods.

2. Copyright Notice/Permission

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawings hereto: Copyright 2004, 2005, Cyberscan Technology Inc., All Rights Reserved.

3. Description of the Related Art

Conventional cashless methods and systems typically rely on centralized accounts (player accounts, anonymous game session accounts, voucher verification accounts, smartcard reconciliation accounts) that are managed by a complex central system (i.e., controlled or coupled to a central server). Such systems require the services of highly trained professionals and the maintenance of stringent security procedures. This leads to high operational costs that are not acceptable for small to medium sized gaming operators. Centralized systems of the prior art are described in U.S. Pat. No. 6,280,328, U.S. Pat. No. 5,265,874 and U.S. Pat. No. 6,048,269.

What are needed, therefore, are cashless gaming methods and systems that overcome the complexity, cost and manpower of conventional gaming methods and systems.

SUMMARY OF THE INVENTION

According to an embodiment thereof, the present invention may be viewed as a gaming machine. The gaming machine may include computer means, game control software and player interaction devices to enable a gaming session with a patron. The gaming session may have meters associated therewith and may include one or more games played by the patron. The gaming machine may include non-volatile solid state memory for storing a state of and meters associated with a currently played game and for storing the meters associated with the gaming session, and a redundant array of independent (or inexpensive) disks (RAID), the game control software being configured to replicate the meters associated with the gaming session to the RAID.

The meters associated with the gaming session may be replicated to the RAID subsequent to the ending of the currently played game. The meters associated with the currently played game may be appended to the RAID subsequent to the end of the currently played game.

According to another embodiment, the present invention is a network of gaming machines that may include a communication network; a first gaming machine coupled to the communication network, the first gaming machine being configured to maintain meters associated with a patron's gaming session, the patron's gaming session including at least one played game; a second gaming machine coupled to the communication network, the first gaming machine including a redundant array of independent (or inexpensive) disks (RAID). The first gaming machine may be configured to backup the meters associated with the patron's gaming session to the RAID may included in the second gaming machine directly over the communication network.

The first gaming machine may include a RAID. The first gaming machine may be a legacy gaming machine comprising a controller and further may include a PC within a locked enclosure thereof, the PC being configured for communication with the network and the controller of the legacy machine, and for controlling the RAID. The first gaming machine may be configured to backup the meter's associated with the patron's gaming session to the RAID included in the second gaming machine directly over the communication network upon occurrence of a predetermined event. The predetermined event may be selected from a group including, for example, an elapsed period of time, an end of a currently played game, a change in the patron's meters, the patron cashing out and an initiation of the patron's gaming session. The RAID may be disposed within a locked enclosure of the second gaming machine.

The present invention, according to still another embodiment thereof, is a network of gaming machines that may include a communication network; a plurality of gaming machines, each of the plurality of gaming machines being coupled to the communication network, the plurality of gaming machines being grouped in a plurality of banks of gaming machines, at least some of the plurality of gaming machines in each bank including a redundant array of independent (or inexpensive) disks (RAID). Each gaming machine within each bank may be configured to backup meters associated with a patron's gaming session to the RAID of at least one gaming machine of a bank other than the bank to which the gaming machine is grouped. The banks of gaming machines may be geographically separated from one another. The banks of gaming machines may be defined according to logical parameters. Each gaming machine within each bank of gaming machines may be configured to backup meters to at least one predetermined preferred gaming machine within at least one bank other than the bank to which the gaming is grouped.

According to another embodiment, the present invention is a method for maintaining meters associated with a cashless gaming session played by a patron on a network including a plurality of networked gaming machines, each gaming machine including a non-volatile solid state memory (NVRAM) for storing a state and meters of a currently played game and for storing the meters associated with the gaming session, and a redundant array of independent (or inexpensive) disks (RAID). The method may include steps of a) initializing meters assigned to the gaming session with a credit amount corresponding to funds received from the patron in a predetermined first gaming machine of the plurality of networked gaming machines; b) if the patron does not initiate the gaming session on the first gaming machine, transferring the meters assigned to the gaming session over the network from the meters in the first gaming machine directly to meters in whichever gaming machine of the plurality of networked gaming machines on which the patron initiates a gaming session; c) metering the gaming session activity, the meters associated with the currently played game stored in NVRAM being appended to the RAID subsequent to an end of the currently played game; d) transferring the meters assigned to the gaming session over the network directly to whichever gaming machine of the plurality of networked gaming machines on which the patron initiates a gaming session, and repeating steps c) and d) as and if needed until the credit amount associated with the meters assigned to the gaming session may be exhausted or a cashout may be requested by the patron.

The method may also include, after step c) the step of backing up the meters assigned to the gaming session directly to at least one other one of the plurality of networked gaming machines subsequent to the end of the currently played game. After step c), the method may also include a step of backing up the meters assigned to the gaming session directly to at least one other one of the plurality of networked gaming machines and stored to its RAID subsequent to the ending of the currently played game, the meters being stored in the RAID of the at least one other one of the plurality of networked gaming machines. After step c), the method may also include a step of backing up the meters assigned to the gaming session directly to at least one other one of the plurality of networked gaming machines subsequent to an end of the gaming session. After step c) a step may be carried out to back up the meters assigned to the gaming session directly to at least one other one of the plurality of networked gaming machines subsequent to an end of the gaming session, the meters being stored in the RAID of the at least one other one of the plurality of networked gaming machines. The transferring step may be carried out independently of any server. The backing up step may also be carried out independently of any server. The first gaming machine may be a legacy gaming machine and further may include a personal computer (PC) within a locked enclosure thereof. The PC may carry out steps of communicating with the network and controlling the RAID. The backing up step may be carried out upon occurrence of a predetermined event. The predetermined event may, for example, be selected from a group including an elapsed period of time, the end of the currently played game, a change in the patron's meters, the patron cashing out and an initiation of the patron's gaming session. The predetermined event may also be selected from a group including an elapsed period of time, the end of the currently played game, a change in the patron's meters, the patron cashing out and an initiation of the patron's gaming session, for example. The meters associated with the gaming session may be replicated to the RAID of the gaming machine on which the patron is playing subsequent to the end of the currently played game. The meters associated to the gaming session of other patrons may be stored in the gaming machine on which the patron is playing. Also, the meters associated with the gaming session of other patrons may be stored to the RAID of the gaming machine on which the patron is playing.

DETAILED DESCRIPTION OF THE INVENTION

In the following detailed description of exemplary embodiments of the invention, reference is made to the accompanying drawings, which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Reference will now be made in detail to the construction and operation of preferred implementations of the present invention illustrated in the accompanying drawings. The following description of the preferred implementations of the present invention is only exemplary of the invention. Indeed, the present invention is not limited to these implementations, but may be realized by other implementations.

Figure 1:
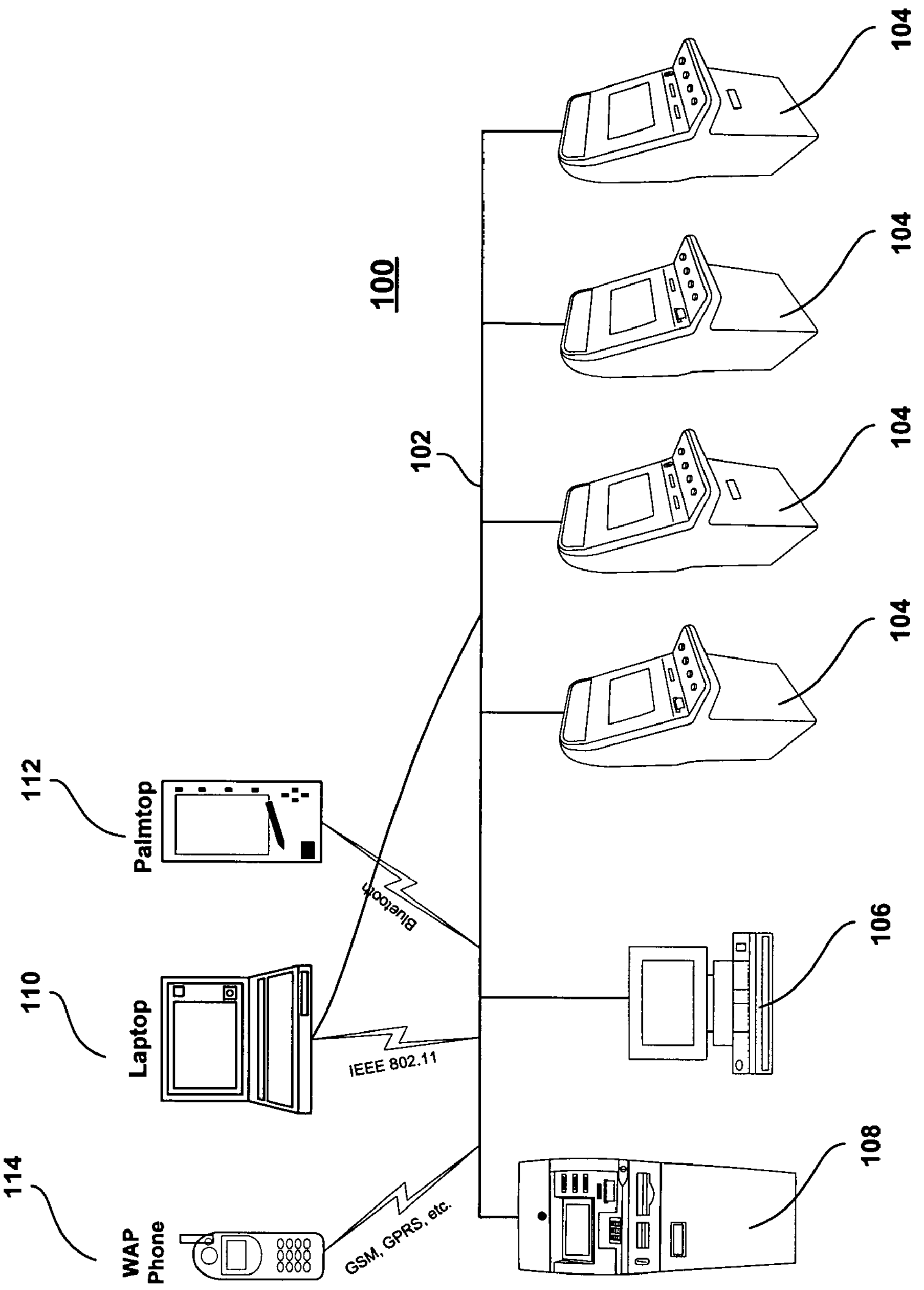
FIG. 1 is an overview diagram of an exemplary server-less cashless gaming system, in accordance with an embodiment of the present invention.

FIG. 1 is an overview diagram of an exemplary server-less cashless gaming system, in accordance with an embodiment of the present invention. As shown therein, a server-less gaming system 100 according to an embodiment of the present invention may include a plurality of gaming terminals 104, a cashier terminal 106 or an automated cashier 108, all communicating via a wired and/or wireless network 102. Wireless entry devices such as laptops 110 using 802.11 (for example), palmtops 112 using Bluetooth or 802.11 (for example), or Wireless Application Protocol (WAP) phones (for example) may advantageously be used in some premises for operators to consult and credit the game session meters. Advantageously, there is no central system (i.e., central server) controlling the gaming system 100.

Figure 2:
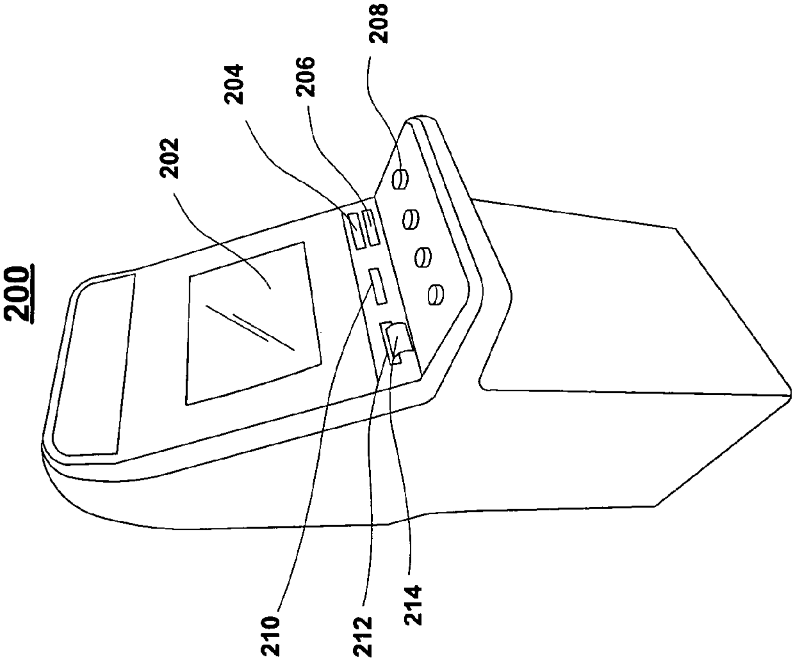
FIG. 2 is a view depicting an exemplary cashless game terminal in accordance with an embodiment of the present invention.

FIG. 2 illustrates an exemplary cashless gaming machine 200 that does not accept or redeem cash. It is to be understood that the gaming machine 200 is but one possible implementation of such a cashless gaming machine and that the present invention is not limited thereto. For cashless operation, the gaming terminal is equipped with means of capturing the encoded information associated with a cashless instrument submitted. The cashless instrument may be a physical portable instrument such as: a paper voucher comprising printed codes; a strong paper ticket comprising printed codes and encoded magnetic codes; a rigid ID card comprising printed codes, magnetic codes or optical codes; a secure contact or contact-less electronic ID device comprising sophisticated electronic (a smart card or a smart dongle); or alternatively, a user ID and password to be typed or spoken, or alternatively again advanced biometric features (finger print, voice recognition, face recognition). The information captured from a cashless instrument is processed in order to derive a pointer to a location containing the necessary computer data to identify and validate the cashless instrument. The information captured from a cashless instrument may contain an encrypted signature (or hash) to ensure that the information has not been maliciously modified. In fine, the cashless instrument allows to derive a valid "identifier code" that is used by the software to execute the appropriate transactions to emulate the use of real cash for the cashless instrument submitted. The cashless instrument is thus denoted "ID instrument" hereafter. The ID instrument may be capable of storing additional information when accessed by a device, or alternatively be replaced by a new one (i.e. a newly printed ticket). The gaming machine ID device(s) accepting the ID instrument submitted may include a magnetic card reader 204, a SmartCard reader and writer 206, a barcode reader 210, a ticket printer 212, a biometric reader (finger print, voice identification, head identification, etc.), a touch-screen 202, keyboard or keypad to enable players to enter a PIN (Personal Identification Number). The gaming machine identification device(s) may further include an ID token reader to read other forms of advanced ID devices such as ID buttons, ID key-chains (such as disclosed, for example in commonly assigned US design patent entitled "Personal Communicator and Secure ID Device" Pat. No. D441,765 issued on May 8, 2001) as well as secure communication means for securely communicating with, for example, personal wallets, hand held computers or computer wrist-watch via infra red, magnetic field, capacitive charges or RF (Bluetooth, IEEE 802.11, etc.) for player identification purposes. A printer 212 may print bar-coded tickets 214 that can be read by a barcode reader 210.

Figure 6:
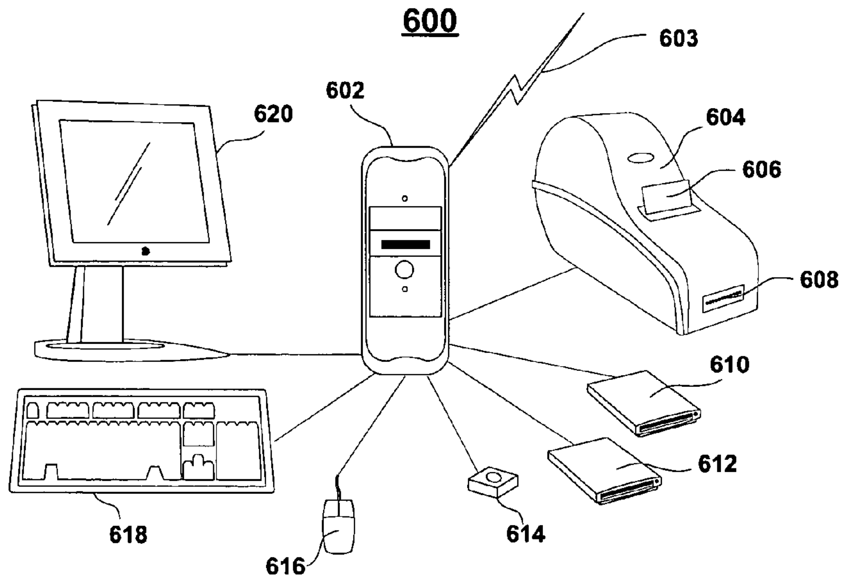
FIG. 6 is a view depicting an exemplary cashier network entry terminal in accordance with an embodiment of the present invention.

FIG. 6 illustrates an example of a networked cashier terminal 600, according to an embodiment of the present invention. The terminal may include a computer 602 connected via wired or wireless link 603 to the network 102 with the gaming machines 104 and a ticket printer 604. The ticket printer 604 may include an integrated printer for printing tickets or receipts 606 that include a human and/or machine readable code imprinted thereon and code reader 608 for reading the code(s) imprinted on the ticket 606. The cashier terminal may also include, for example, a magnetic card reader 610, a SmartCard reader 612, a biometric reader 614 (such as a fingerprint reader, for example), a display 620 and input devices such as a keyboard 618 and/or a mouse 616. The cashier terminal may be controlled by an operating system capable of secure network communication such as Microsoft Windows, embedded XP or Linux, for example.

Figure 3:
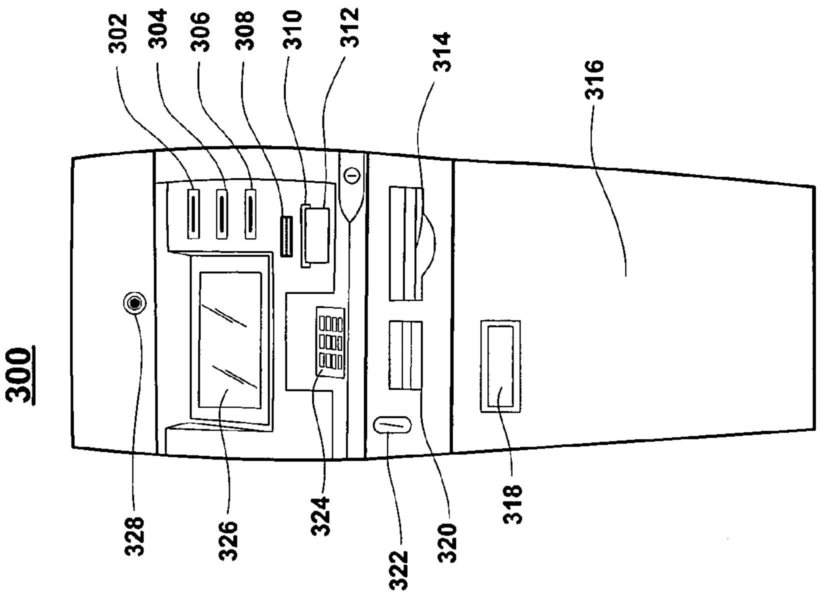
FIG. 3 is a view depicting an exemplary automated cashier in accordance with an embodiment of the present invention.

FIG. 3 illustrates an embodiment of an automated cashier 300, which dispenses with the need for a human cashier. The automated cashier 300 may include an internal computer connected to the network 102 with the gaming terminals 104, a coin acceptor 322, a note acceptor 320, a coin dispenser/hopper 318, a SmartCard or magnetic card dispenser 304, a note dispenser 314, a ticket printer 310 for printing a ticket 312, a magnetic card reader 302, a SmartCard reader/writer 306, a barcode reader 308, display with touch-screen 326, a keypad 324, a video camera 328 and/or a UL 291 certified cash safe 316, for example. The UL 291 certified cash safe 316 prevents or deters robbery of the cash stored inside the automated cashier 300. The automated cashier 300 may further include biometric ID readers, ID token readers to read other forms of advanced ID devices such as ID buttons, ID key-chains, etc., as well as secure communications means for communicating with personal wallets, hand held PCs or computer wristwatch via infrared, magnetic field, capacitive charges or RF (Bluetooth, IEEE 802.11, etc.) for identification purposes.

Figure 4:
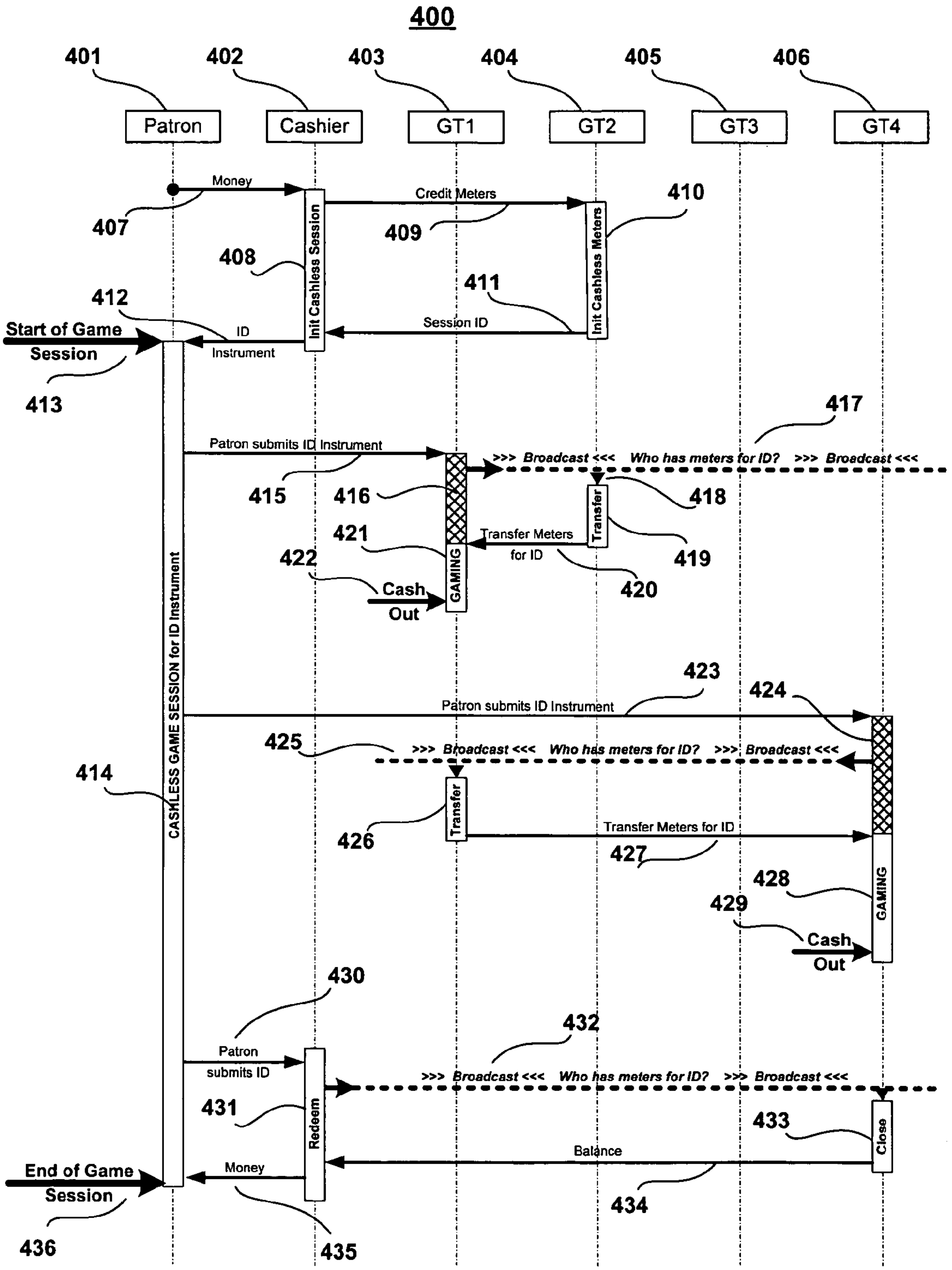
FIG. 4 is a diagram depicting a server-less cashless game session in accordance with an embodiment of the present invention.

According to one embodiment of the present invention, the gaming terminals (GT) 104 are advantageously configured to support functions traditionally implemented by central systems. FIG. 4 illustrates an embodiment of a server-less cashless gaming session according to the present invention. A patron 401 initially interacts with a cashier 402 to establish a cashless session 407 through to 412. The patron 401 initializes a cashless session 408 by handing over an amount of money 407 (in whatever form) to the cashier 402. The cashier 402 initializes the cashless meters 410 located on a predetermined gaming terminal 404 by issuing a credit meters transaction 409 using a cashier terminal 600. The gaming terminal 404 executes a process 410 to initialize in persistent storage the cashless meters associated with this cashless session. The gaming terminal 404 may then return a session ID 411 for later access and retrieval. The cashier 402 may complete the cashless session 408 by providing the patron 401 with an ID instrument 412 corresponding to session ID 411. The ID instrument 412 may be or include a printed ticket with text and/or encoded barcode, a printed ticket with text and/or embedded encoded magnetic strip (such as a metro ticket, for example), a magnetic ID card, a smart ID card, fingerprint recognition, voice recognition, face recognition, palm recognition (or any biometric recognition), ID buttons, ID key-chains, a personal electronic wallet, a secure handheld Computer, a secure mobile phone a secure computer wrist watch, a bar-coded ticket, a bar-coded voucher or any imaginable way to associate identification means with a physical or electronic media. A PIN number may also be given for challenging the ID instrument. The identification of the cashless session may be entirely anonymous or alternatively, may be associated with the patron's identity or membership in some group. In the later case, necessary personal identification data may be captured by the cashier when money is deposited 407 and are submitted together with the credit meters 409 for persistent storage in the gaming terminal 404 during the process 410.

The exact same cashless session 407 through 412 may be performed by making use of the automated cashier 300 instead of the cashier terminal 600 wherein the role of the cashier 402 is replaced by an automated program executed in the automated cashier. Suitable peripherals may be attached to the automated cashier 300 to allow for the deposit of funds, capture of information and dispensing of ID instruments.

The start 413 of a cashless game session 414 may be identified by the patron 401 receiving the ID instrument 412. The end 436 of the cashless game session 414 may be identified by the patron 401 redeeming the credit balance of money 435 associated with his ID instrument 412, or when the credit associated with his ID is exhausted (null).

The patron 401 (who forms no part of the present invention and whose actions are only described herein to illustrate aspects of the present invention), subsequent to receiving an ID instrument 412, may execute a certain number of cashless operations associated with his ID instrument. The patron may choose any gaming terminal 403, 404, 405 or 406 to play on. In the illustration of FIG. 4, the patron first chooses the gaming terminal 403 and submits his ID instrument 415 to the gaming terminal 403. If the gaming terminal 403 does not have ownership of the cashless meters associated with the ID instrument submitted, it may immediately broadcast on the network 102 a request to acquire the cashless meters associated with the patron's ID instrument. All the gaming terminals on the network 102 intercept the broadcast. The gaming terminal 404 having ownership of the cashless meters initiates at 418 a transfer procedure 419 to transfer ownership and full content of the cashless meters associated with the ID 420 to the gaming terminal 403. Upon receiving ownership and content of the cashless meters, gaming terminal 403 initializes its local game meters with the value of the cashless meters received and enters a gaming session 421 wherein the patron may play continuously until credit is exhausted or until the cash-out signal 422 is activated. Any winning is added to the patron's credit balance.

When the cash-out signal 422 is activated by the patron, the player may use the remaining of his or her credit to play on another gaming terminal or redeem the credit for cash. A ticket showing the credit remaining may be printed if a printing device is available on gaming terminal 403. In the illustration of FIG. 4, patron 401 chooses to play on gaming terminal 406 and submits his ID instrument 423 to the gaming terminal 406. Gaming terminal 406 does not have ownership of the cashless meters associated with the ID instrument submitted. Therefore, it may immediately broadcast on the network a request to acquire the cashless meters associated with the ID instrument. All the gaming terminals on the network intercept the broadcast. The gaming terminal 403 having ownership of the cashless meters initiates a transfer procedure 426 to transfer ownership and full content of the cashless meters associated with the ID 427 to the gaming terminal 406. The gaming terminal 403 may deny the transfer of the meters if credit is exhausted or already paid, thus preventing the patron from playing on gaming terminal 406. Upon receiving ownership and content of the cashless meters, gaming terminal 406 initializes its local game meters with the value of the cashless meters received and enters a gaming session 428 wherein the patron may play continuously until credit is exhausted or until the cash-out signal 429 is activated. Any winning is added to the credit balance.

When the cash-out signal 429 is activated, the player may use any remaining credit to play on another gaming terminal or may redeem the credit for cash (or for credit on another payment instrument or account). A ticket showing the credit remaining may be printed if a printing device is available on gaming terminal 406. In the illustration of FIG. 4, patron 401 chooses to redeem his credit for cash. The patron submits his ID instrument at 430 to the cashier 402 who initiates a redeem process 431 that may immediately broadcast on the network a request to acquire the cashless meters associated with the ID instrument submitted 430. All the gaming terminals on the network intercept the broadcast. The gaming terminal 406 having ownership of the cashless meters authorizes payment by initiating a closure process 433 to terminate ownership of the cashless meters and forward the credit balance amount to pay at 434 to the cashier terminal 402. The gaming terminal 406 may deny payment if credit is exhausted. Upon receiving the authorization from gaming terminal 406, the cashier 402 then hands over the associated money 435 to the patron 401. The cashless game session associated with the ID instrument 414 terminates 436 when the patron receives his money 435. It is understood that the actions of the cashier described herein may be readily automated.

In another embodiment of the present invention, the patron may request partial payment of the credit available. In that case, the gaming terminal 406 having ownership of the cashless meters associated with the patron or the patron's ID instrument authorizes payment and initiates an update process instead of a closure process 433 in order to reflect the amount of payment made. Subsequently, the patron may continue to play on any gaming terminal or later redeem his credits at a cashier using his ID instrument.

For clarity of illustration, the server-less gaming session 400 of FIG. 4 shows only four game terminals and one cashier operating over a peer-to-peer platform. This is an ideal scenario for small game operators. It should be apparent to those acquainted with modern network architectures that the peer-to-peer architecture disclosed herein is highly scalable and robust and that the scenario 400 can be extended to a large gaming estate comprising tens of thousands of gaming terminals and hundreds of cashier terminals or automated cashiers. Moreover, peer-to-peer mechanisms may be provided by modern operating systems such as Microsoft .NET and secure network protocols may be automatically activated by setting the appropriate security policy such as Internet Protocol Security (IPSec) or Secure Socket Layer (SSL), for example. Furthermore, cashier terminals 600 and automated cashier 300 only require simple "stateless" .NET client applications or web browser sessions for interacting with the gaming terminals 104. The term "stateless" denotes that the software that executes in the cashier terminal 600 and in the automated cashier 300 is not responsible for managing and recording the game session implicit state or context. The context of a software session is the ordered sequence of properties of the software objects that defines it at a particular instant in time. The context (or implicit state) of a cashless gaming session is controlled and recorded by the gaming terminal that owns the associated cashless session meters. The context of a cashless gaming session includes the meters. The gaming terminal may advantageously store the game session context that includes the meters in a non-volatile memory for fault-tolerance.

Figure 7:
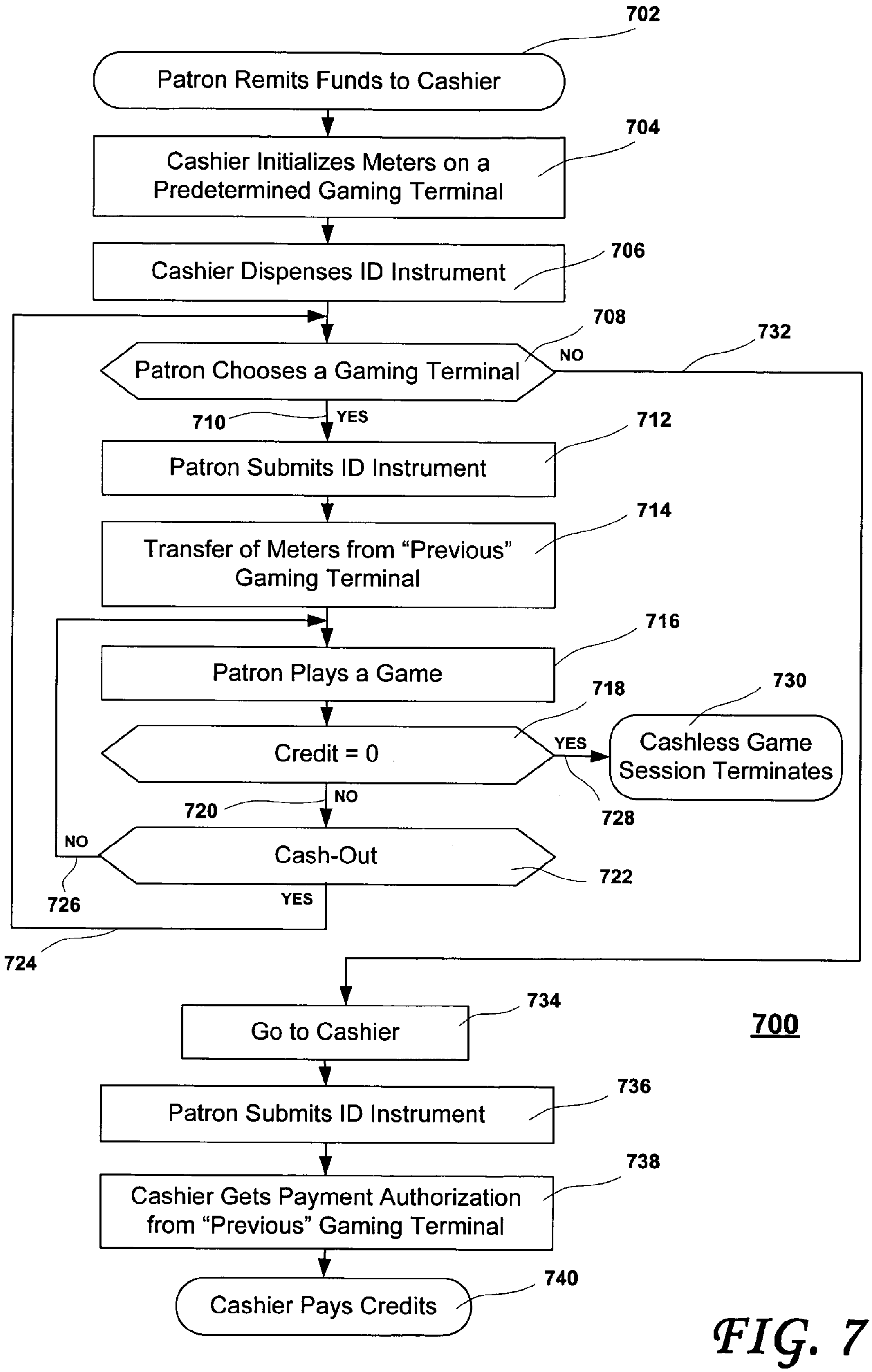
FIG. 7 is a flowchart depicting the cashless meters in accordance with an embodiment of the present invention.

The method and a server-less gaming session 400 of the present invention and illustrated on FIG. 4 is further illustrated in a flowchart 700 of FIG. 7. As shown, a patron remits funds to any of the cashiers at 702, whereupon the cashier initializes meters on a predetermined gaming terminal at 704 and the cashier dispenses and ID instrument to the patron at 706. At 708, the patron may choose to play on a gaming terminal at 710 or go to the cashier 734 to redeem his credit, such as shown at 732.

The patron submits his ID instrument at 712 to the selected gaming terminal that requests transfer of meters associated with the ID instrument from a previous gaming terminal 714 (the gaming terminal on which the patron last played), or alternatively in the case whereby the patron has just remitted funds to a cashier, from the gaming terminal on which the cashier has initialized the meters on. The previous gaming terminal may deny transfer of meters if the credit is exhausted or already paid, thus preventing the patron from playing a game.

Once the transfer of meters from a previous gaming terminal is successfully completed, the patron may repetitively play a game at 716 as long as his credit is not exhausted as shown at 718 or the cash-out signal has not been activated 722, 726. In case credit is exhausted 728, the patron can no longer play and the cashless game session terminates at 730.

After activating the cash-out signal 722, 724, the patron may choose another gaming terminal 708 and proceed as described above. If the patron no longer wishes to play 732, he may go to a cashier 734 to redeem his credit by submitting his ID instrument 736. The cashier may use his network entry terminal to obtain payment authorization from the previous gaming terminal 738. If authorization is given, the credit amount available in the meters of the previous gaming machine may be paid by the cashier 740, and the meters at the previous gaming terminal may be updated to reflect the payment.

Traditionally and in compliance with gaming jurisdictions, gaming terminals may contain a set of highly secure persistent meters comprising essentially the patron's credit balance, the meters associated with a variety of events such as coins inserted and coins given out for a particular game, and an audit log of events for later examination if required. The operation for updating the meters in accordance with the game session activity is commonly referred as metering. Metering also infers that the necessary storage and access means to the meters are available. Applying modern object oriented programming and persistent data storage techniques such as structured access to non-volatile memory, the meters may be defined as a class that is dynamically instantiated at run time. It may be clear to those acquainted with object programming that a multitude of instantiations of the meters class may be obtained, the only limitation being the memory available. Memory being plentiful on a typical computer unit controlling a gaming terminal, a substantial number of instantiations of the meters class may be obtained.

Figure 5:
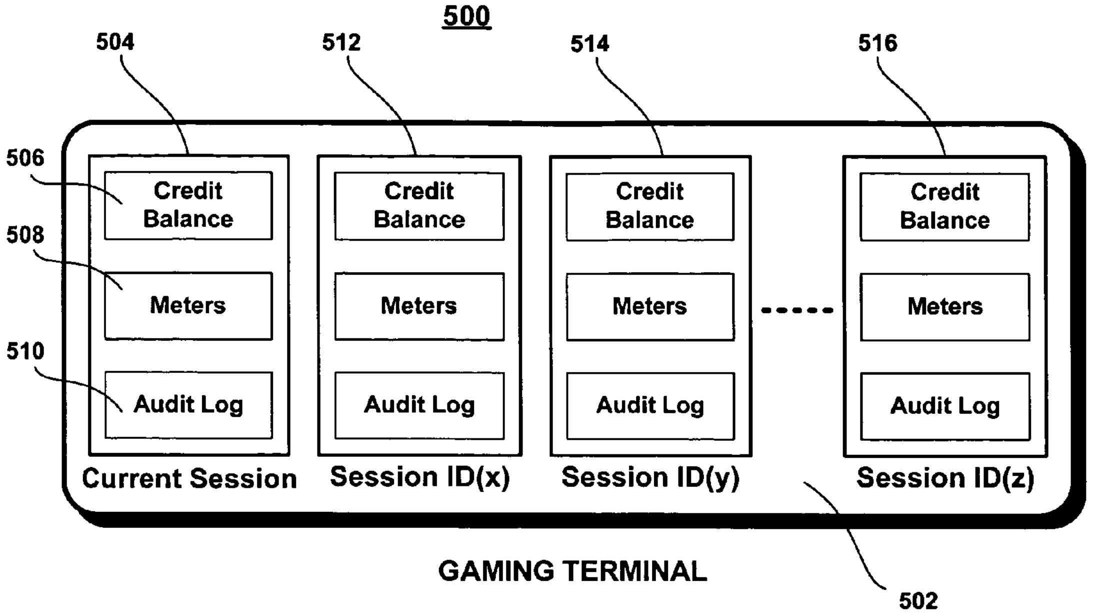
FIG. 5 is a diagram depicting the cashless meters in accordance with an embodiment of the present invention.

FIG. 5 illustrates the instantiation of a number of cashless meters 500 that may be obtained on a gaming terminal 502. The gaming terminal 502 has taken ownership of the cashless meters associated with each of the patrons' submitted ID instrument for ID(x), ID(y) through ID(z) and the gaming activity in process on gaming terminal 502 is reflected in the current session cashless meters 504. The credit balance displayed to the patron currently playing corresponds to the credit balance meter 506; the other meters 508 and the audit log 510 may be reserved for use by the game operator. The cashless meters may be frozen when the patron activates the cash-out signal.

The other meters 512, 514 and 516 are associated with gaming sessions played previously on the gaming terminal 502 and are frozen. Alternatively, any of the meters 512, 514 or 516 may be associated with a new cashless session initiated by the cashier when the patron deposit funds as explained relative to steps 407 to 412. Gaming terminal 502 retain ownership of the frozen meters until ownership is requested by another gaming terminal. If the credit remaining on these meters is exhausted, transfer of ownership to another gaming terminal is denied. If a redeem operation is requested by the cashier terminal or the automated cashier while some credit is available, the gaming terminal 502 authorizes payment, closes the meters and retains ownership of the closed meters. The closed meters may be erased at a later time in order to recover storage space in accordance with the gaming operator's rules for flushing old data.

The peer-to-peer metering method object of the present invention is suitable for supporting all forms of cashless instruments such as:

a player account;
an anonymous game session account;
a voucher verification account;
a time gaming account;
a smartcard reconciliation account.

A cashless player account is identified by a unique identifier key assigned to a patron that points to a set of records stored in computer memory containing the patron's personal details and the state of the cashless session. The records may be queried and updated by authorized software using the key that may be derived from the ID instrument submitted. The state of the cashless session may include essentially the balance of monetary credit available to the patron (the primary meters) and some auxiliary attributes (secondary meters) reflecting the games played, the time stamping of various operations, a flag indicating if the meters are owned by the gaming terminal hosting the meters and a flag indicating if available credits have already been paid.

An anonymous game session account is identified by a unique identifier key assigned to a game session that points to a set of records stored in computer memory containing the state of the cashless session. The records may be queried and updated by authorized software using the key that may be derived from the ID instrument submitted. The state of the cashless session may include essentially (the primary meters) the balance of monetary credit available to the anonymous older of the ID instrument and some auxiliary attributes (secondary meters) reflecting the games played, the time stamping of various operations, a flag indicating if the meters are owned by the gaming terminal hosting the meters and a flag indicating if available credits have already been paid.

A voucher verification account is identified by a unique identifier key assigned to a voucher that points to a set of records stored in computer memory containing the state of the cashless session. The records may be queried and updated by authorized software using the key that may be derived from the voucher submitted. The state of the cashless session may include essentially (the primary meters) the balance of monetary credit available to the holder of the voucher and verification data, and some auxiliary attributes (secondary meters) reflecting the games played, the time stamping of various operations, a flag indicating if the meters are owned by the gaming terminal hosting the meters, and a flag indicating if available credits have already been paid. In the case of a cash-out at the gaming terminal or alternatively when funds are remitted to a human cashier or an automated cashier, a voucher comprising clear text and machine-readable code representing the monetary value of the credit available and some verification data is dispensed. The clear text may indicate the value of the credit available, or simply said for the holder, "the value of voucher". In the case of a cash-in at the gaming terminal or alternatively when requesting the redeem of credits to a human cashier or an automated cashier, a voucher comprising clear text and machine-readable code representing the monetary value of the credit available and some verification data is read. The unique identifier key is derived from the verification data upon reading the clear text and/or the machine-readable code. The associated records are then queried in order to authenticate the value of the voucher by comparing the verification data contained in the records with the verification data read from the voucher. It should be apparent to those acquainted with secure transactional techniques that the unique identifier key, or alternatively the verification data, may be a hash or an encrypted signature of all or portion of the clear text and/or the machine-readable code.

A time gaming account may be associated to a patron or be anonymous.

A time gaming player account is identified by a unique identifier key assigned to a patron that points to a set of records stored in computer memory containing the patron's personal details and the state of the cashless session. The records may be queried and updated by authorized software using the key that may be derived from the ID instrument submitted. The state of the cashless session may include essentially (the primary meters) the balance of time-to-play and the total of winnings available to the patron, and some auxiliary attributes (secondary meters) reflecting the games played, the time stamping of various operations, a flag indicating if the meters are owned by the gaming terminal hosting the meters and a flag indicating if available credits have already been redeeming.

An anonymous time gaming account is identified by a unique identifier key assigned to a gaming session that points to a set of records stored in computer memory containing the state of the cashless session. The records may be queried and updated by authorized software using the key that may be derived from the ID instrument submitted. The state of the cashless session may include essentially (the primary meters) the balance of time-to-play and the total of winnings available to the anonymous holder of the ID instrument, and some auxiliary attributes (secondary meters) reflecting the games played, the time stamping of various operations, a flag indicating if the meters are owned by the gaming terminal hosting the meters and a flag indicating if available credits have already been redeeming.

A smartcard reconciliation account is identified by a unique identifier key assigned to a smartcard that points to a set of records stored in computer memory. The records therefor are a "slave" mirrored copy of same records containing the state of the cashless session that are maintained in the electronic circuits of the smartcard. The smartcard maintains the "master" copy of the records. The slaved mirrored records may be queried but not updated by authorized software using the key that may be derived from the smartcard submitted. The state of the cashless session may include essentially the balance of credit available to the holder of the smartcard (the primary meters) and some auxiliary attributes (secondary meters) reflecting the games played, the time stamping of various operations, a flag indicating if the meters are owned by the gaming terminal hosting the meters and a flag indicating if available credits have already been paid. The slaved mirrored records are used to reconcile accounting when the smartcard is used in order to detect possible forgery. Alternatively, the slaved mirrored records are used as a backup repository to pay the holder of the smartcard in case of the failure of the smartcard. When used for backup, the "slave" records may be updated by authorized software using the key that may be derived from the smartcard submitted (embossed code for example).

The ID instrument used to derive the unique identifier key may be submitted in a variety of ways such as typing a user ID and password, keying-in a code on a keypad, presenting a bar-coded voucher, an encoded card, a secure electronic ID device or recognizing biometric features.

The unique identifier keys are commonly called GUI or global unique identifier.

Fault tolerance may be achieved by replicating (mirroring) cashless meters owned by a given gaming terminal to a predetermined number of other peer gaming terminals. The gaming terminals holding replicated cashless meters are second-level owners that may be solicited in case the primary owner does not respond to the initial transfer request, whether the request is a direct one to an identified gaming terminal or broadcast to all gaming terminals on the network. For example, in case gaming terminal 403 does not obtain any reply subsequent to its transfer request broadcast 417 after a time-out, a new broadcast message explicitly soliciting secondary owners may be sent on the network. Gaming machine 403 would then accept the transfer of cashless meters from a responding secondary owner.

In another embodiment of the present invention, the gaming terminal may be able to encode information on the ID instrument submitted by the patron. The identification of the gaming machine used by the patron may advantageously be encoded on the ID instrument such that the next used gaming terminal knows immediately upon reading the ID instrument the identity of the previously used gaming terminal. Consequently, the next used terminal may establish network communication with the previously used gaming terminal without having to rely on network broadcasting techniques to find out which of the connected gaming terminals is the last used gaming terminal, thus reducing the time to start transferring the meters and the overall network traffic. In case the last gaming terminal is not contactable, a network broadcast to find a secondary owner of the meters may be initiated.

Figure 8:
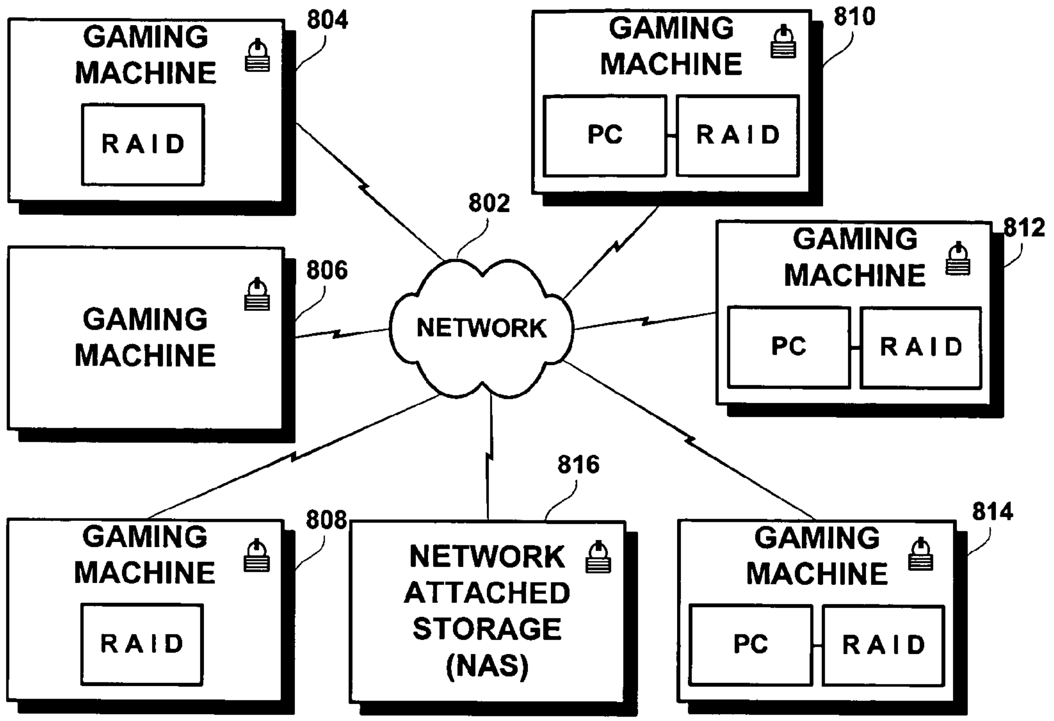
FIG. 8 shows a network of gaming machines, according to another embodiment of the present invention.

According to a further embodiment of the present invention, one or more of the gaming machines or terminals may include a redundant array of independent disks (more commonly known as a RAID), as shown at 804, 808 and 810, 812 and 814 in FIG. 8. RAID is a system of using multiple hard drives for sharing or replicating data among the drives. Depending on the version chosen, the benefits of incorporating RAID in one or more gaming machines may include increased data integrity, fault-tolerance, disaster tolerance, and higher throughput or capacity compared to single drives. In its original implementations (in which the RAID acronym stood for "Redundant Array of Inexpensive Disks"), RAID's key advantage was the ability to combine multiple low-cost devices using older technology into an array that together offered greater capacity, reliability, and/or speed than was affordably available in singular devices using the newest technology. However, as the cost per gigabyte of hard disk storage continues to decrease, the importance of such cost considerations has lessened.

At the very simplest level, RAID is one of many ways to combine multiple hard drives into one single logical unit. Thus, instead of seeing several different hard drives, the gaming terminal's operating system sees only one. With decreases in hard drive prices and wider availability of RAID options built into motherboard chipsets, gaming machines according to embodiments of the present invention may become standard.

The original RAID specification suggested a number of prototype "RAID Levels", or combinations of disks. There are even some single-disk implementations of the RAID concept. In that case, the array may be formed from disk partitions instead of whole disks. Herein, the acronym RAID is intended to include within its definition any system that employs one or more of the basic RAID concepts to recombine physical disk space for purposes of, for example, reliability, performance, fault or disaster tolerance, and/or gaming jurisdictional regulations.

RAID was first patented by IBM in 1978. In 1988, RAID levels 1 through 5 were formally defined by David A. Patterson, Garth A. Gibson and Randy H. Katz in the paper, "A Case for Redundant Arrays of Inexpensive Disks (RAID)". This was published in the SIGMOD Conference 1988: pp 109-116. The term "RAID" started with this paper. While the "I" in RAID now generally means independent, rather than inexpensive, one of the original benefits of RAID was that it did use inexpensive equipment, and this still holds true in many situations, where relatively inexpensive IDE/ATA disks are used. However, independent (and somewhat more expensive) SCSI hard disks may readily be used as constituent drives in the array, as the cost of such disks is now much lower than it once was—and much lower than the systems RAID was originally intended to replace. According to other embodiments of the present invention, the RAID within the gaming machines may be implemented either in dedicated hardware or custom software running on standard hardware. In addition, the RAID implemented on the present gaming machines may be implemented as hybrid RAIDs that are partly software- and partly hardware-based solutions.

With a software implementation, the gaming machine's operating system manages the disks of the array through its drive controller (IDE, ATA, SATA, SCSI, Fibre Channel or any other). At present CPU speeds, software RAID can be faster than hardware RAID, though at the cost of using processing power that might be better used for other tasks. One exception is where the gaming machine is configured for battery backed-up write cache and the gaming application is configured to flush writes to secure storage to preserve data at a known point in the event of a crash. In this case, the software solution is limited by the rotational speed of the drive's magnetic media (typically about 7,500 to 15,000 rpm), while the hardware approach may be faster and limited instead by RAM speeds, the amount of cache and how fast it can flush the cache to disk. Another disadvantage of a pure software RAID is that, depending on the disk that fails, the gaming machine may not be able to be rebooted until the array has been rebuilt.

A gaming machine incorporating a hardware implementation of RAID may require a special-purpose RAID controller. Such a RAID controller may be configured within the gaming machine as, for example, a PCI expansion card. Alternatively, the RAID functionality may be built in into the gaming machine's motherboard. Moreover, legacy gaming machines may be provided with such RAID capability by, for example, incorporating a PC within the locked enclosure thereof, and configuring the PC for RAID functionality, as shown at 801, 812 and 814 in FIG. 8. The constituent disks forming the RAID may be IDE, ATA, SATA, SCSI, or Fibre Channel (for example) or any other existing or to-be-developed standard. The controller may be coupled to the host gaming machine processor or with the host PC within a legacy gaming machine via one or more high-speed connections, such as SCSI, Fibre Channel or iSCSI connections (for example). The controller may also be coupled to one or more Network Attached Storage (NAS) such as shown at 816 in FIG. 8, which NAS may be accessible through the network of gaming machines and may be physically located in a secured, accessed-controlled area of the casino or other gaming establishment—and/or other geographically remote offsite secured facility. The disk controller may handle the management of the array of disks within the gaming machine, and may perform parity calculations (needed for many RAID levels). Preferably, the RAID incorporated into one or more of the present gaming machines may support hot swapping, thereby allowing failed drives to be replaced while the gaming machine is running. According to further embodiments, one or more of the gaming machines may include so-called hybrid RAID, in which the disk controller is a "normal" disk controller that has no RAID features, and a boot-time setup application sets up a RAID array and accesses to the RAID may be carried out via BIOS functions. For added data security, the present gaming machine may be configured to support the use of a hot spare, which may include a preinstalled drive which may automatically replace any failed drive within the array.

The RAID within one or more of the present gaming machines may be configured according to different RAID levels. The array within the gaming machine may, for example, be configured as a RAID 0 (also known as a striped set), that splits data evenly across two or more disks within the gaming machine with no parity information for redundancy. RAID 0 is normally used to increase performance, although it may also be a useful way to create a small number of large virtual disks out of a large number of small physical ones. RAID 0 implementations with more than two disks are also possible, however the reliability of a given RAID 0 set is equal to the average reliability of each disk divided by the number of disks in the set. That is, reliability (as measured by mean time between failures (MTBF)) is inversely proportional to the number of members—so a set of two disks is half as reliable as a single disk. The reason for this is that the file system is distributed across all disks. When a drive fails the file system cannot cope with such a large loss of data and coherency since the data is "striped" across all drives.

RAID 0 is useful for setups such as large read-only NFS servers where mounting many disks is time-consuming or impossible and redundancy is irrelevant. Another use is where the number of disks is limited by the operating system. In Microsoft Windows, the number of drive letters for hard disk drives may be limited to 24, so RAID 0 is a popular way to use more than this many disks. It is also a popular choice for gaming systems where performance is desired. However, since there is no redundancy, yet data is shared between drives, hard drives cannot be swapped out as all disks are dependent upon each other.

Although not, strictly speaking, considered to be a RAID implementation, a gaming machine according to another embodiment of the present invention may also be provided with a concatenation of disks (also called JBOD, or "Just a Bunch of Disks"). JBOD implementations may be used for the purpose of combining multiple physical disk drives into a single virtual one within the gaming machine. As the name implies, disks are merely concatenated together, end to beginning, so they appear to be a single large disk. This implementation may not provide as many benefits as it once did, as even inexpensive drives boast storage capacities approaching 1 GB as of this writing.

According to another embodiment of the present invention, a gaming machine equipped with a Level 1 RAID may be configured to create an exact copy (or mirror) of all of data on two or more disks within its locked enclosure. This embodiment is advantageous where redundancy is more important than using all the disks' maximum storage capacity. The array can only be as big as the smallest member disk, however. An ideal RAID 1 set contains two disks, which increases reliability by a factor of two over a single disk, but it is possible to have many more than two copies. Since each member can be addressed independently if the other fails, reliability is a linear multiple of the number of members. To truly get the full redundancy benefits of RAID level 1, independent disk controllers may be provided within the gaming machine, preferably, one for each disk. When writing a RAID 1 acts like a single disk as all writes must be written to all disks.

RAID 1 has many advantages in the context of gaming machines. For instance, where the gaming machines must be operative 365 days a year and 24 hours a day, it is possible to "Split the Mirror"; that is, to declare one disk as active, perform a backup of the inactive disk, and then "rebuild" the mirror.

A gaming machine configured for RAID 2 may be configured to stripe data at the bit (rather than block) level, and may utilize an error correction code, such as a Hamming code, for example. The disks may be synchronized by the controller to run in perfect tandem.

In contrast, a gaming machine configured with a level 3 RAID may utilize byte-level striping with a dedicated parity disk. A possible disadvantage of RAID 3 within the context of gaming machines is that RAID 3 generally cannot service multiple requests simultaneously. This comes about because any single block of data will by definition be spread across all constituent drives of the set and will reside in the same location, so any I/O operation requires activity on every disk.

A gaming machine equipped with a RAID 4 array may utilize block-level striping, also with a dedicated parity disk. In this manner, RIAD 4 is similar to RAID 3, except that it stripes at the block, rather than the byte level. This allows each member of the set to act independently when only a single block is requested. If the gaming machine's disk controller allows it, a RAID 4 set can service multiple read requests simultaneously.

A RAID 5 gaming machine may be configured to utilize block-level striping, but with the parity data distributed across all member disks. RAID 5 is one of the most popular RAID levels, and gaming machines according to this embodiment may be configured with both hardware and software implementations.

A gaming machine equipped with a level 6 RAID may utilize block-level striping with parity data distributed twice across all member disks. In RAID 6, parity is generated and written to two distributed parity stripes, on two separate drives, using a different parity stripe in each two dimensional "direction".

Gaming machines may also be configured, for increased fault tolerance, with nested RAID Levels. That is, one RAID can use another as its basic element, instead of using physical disks. In this manner, the RAID arrays may be thought of as layered on top of each other, with physical disks at the bottom. Nested RAID arrays may be designated by joining the numbers indicating the RAID levels into a single number, sometimes with a '+' in between. For example, RAID 10 (or RAID 1+0) may be thought of as including multiple RAID1 arrays stored on physical disks with a RAID 0 array on top, striped over the RAID 1 arrays. In the case of RAID 0+1, it is most often called RAID 0+1 as opposed to RAID 01 to avoid confusion with RAID 1. Various combinations of RAID levels may be configured in a number of nested RAID levels. In addition, the present gaming machines may be configured with any one of a number of proprietary RAID levels, which differ from the idealized RAID specification to varying extents. The nesting, according to embodiments of the present invention, need not occur solely within a single gaming machine, but may span a number of interconnected gaming machines, such that the nesting of the RAID arrays is only apparent when considering the collective structure of the individual RAID within a plurality of interconnected gaming machines.

According to an embodiment of the present invention, a method for metering a cashless game session played by a patron on a network (such as shown at 802 in FIG. 8) that includes a plurality of networked gaming machines (or terminals, as the terms 'machine' and 'terminal' are used interchangeably herein) may include an initial step of initializing meters assigned to the game session with a credit amount corresponding to funds received from the patron in a predetermined one of the gaming machines coupled to the network. The meters may be stored in a random access memory, such as Non Volatile Random Access Memory (NVRAM), for example. The amount of NVRAM, however, may be limited. Therefore, the gaming machine on which the patron initiated the game session need only store the information representative of the current state of gaming activity in the NVRAM. As NVRAM may be a limited resource within the gaming machine, meters associated with the patron's game session may be stored in NVRAM, and periodically flushed to another persistent memory, such as one or more disk drives located within the locked enclosure of the gaming machine. Such disk drive(s) may be configured in a RAID or JBOD configuration within the gaming machine. The timing of the disk writes from NVRAM to RAID may be freely chosen. For example, the meters associated with the patron's gaming session may be written to disk (e.g., written to the one or more disk drives configured as a RAID) periodically, every time the meters associated with the patron's gaming session change or upon cashout, to name only a few possibilities. Therefore, according to an embodiment of the present invention, a network of gaming machines may include a plurality of gaming machines, each equipped with one or more disk drives (magnetic disk drives, for example) in a RAID configuration. The network of gaming machines may include gaming machines equipped with a RAID and also may include gaming machines no so equipped.

To ensure that the meters associated with the player's gaming session are not inadvertently lost due to some failure, another embodiment of the present invention contemplates backing up the patron's meters on one or more other gaming machines coupled to the network of gaming machines. Such backup may occur periodically, may be regularly schedule or may be triggered by some event. For example, the event triggering the backup of the patron's meters may include the patron requesting a cashout. The backup may also occur when the gaming session is first initiated. Whenever carried out, the meters associated with the patron's gaming session may be backed up to one or more gaming machines coupled to the network and/or to one or more other devices, such as a NAS. The gaming machine or machines to which the patron's meters are baked up may be pre-selected by the gaming machine on which the patron is currently playing or may have been assigned to the gaming machine. Alternatively, the gaming machine or machines to which the patron's meters are backed up may be randomly selected or may be that or those gaming machines that responded to a query from the gaming machine on which the patron is currently playing or the gaming machine on which the patron requested a cashout. For example, a gaming machine may broadcast a request to other gaming machines to store a backup of the patron's meters over the network 802. Thereafter, the gaming machine currently holding the patron's meters may then send a copy of the patron's meters to one or more of the responding gaming machines that responded to the request. For example, the patron's current gaming machine may transfer a copy of the patron's meters to the first gaming machine that responds to the request. The copy of the patron's meters transferred to the responding gaming machine(s) may be stored in the gaming machine's RAID. Note that the gaming machine(s) to which the patron's meters are backed up may already store one or more other backups of other patron's meters in their respective RAIDs.

Figure 9:
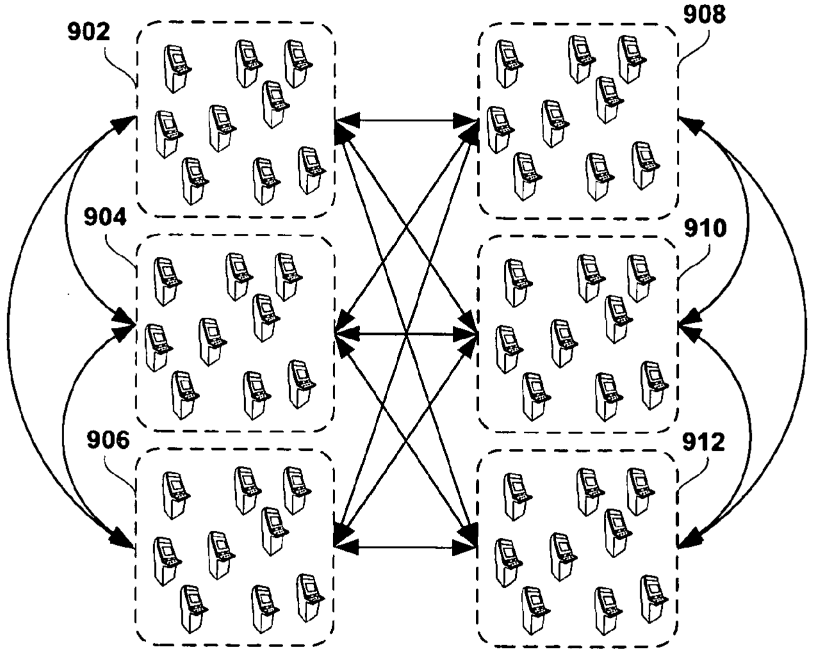
FIG. 9 shows banks of gaming machines, to illustrate aspects of another embodiment of the present invention.

As shown in FIG. 9, casinos sometimes configure their gaming machines into physical and/or logical groupings of gaming machines. Such groups may be called banks and are shown in FIG. 9 at 902, 904, 906 and 908, 910 and 912. Banks of gaming machines need not have the same number of gaming machines, nor need they include the same kind of gaming machines. Indeed, different gaming machines may be included in each bank. For example, each bank may include an arbitrary number of 255 gaming machines. The banks may be formed of co-located gaming machines or specific types of gaming machine. The banks need not be static and a gaming machine's membership in a group may change over time. For example, banks of gaming machines may be geographically separated and/or may draw their power from separate electrical circuits.

Such banks of gaming machines 902-912 may find utility in backing up the meters associated with a patron's gaming session. For example, the patron's current gaming machine may request that one or more of the gaming machines in its own group backup the patron's meters. Alternatively, the patron's gaming machine may request that one or more of the gaming machines belonging to a bank other than its own backup the patron's meters. For example, the patron's current gaming machine may request that one or more gaming machines belonging to the geographically farthest bank backup the patron's gaming machine. Such a bank selection may help ensure the survivability of the backups in the case of a disaster, under the assumption that gaming machines belonging to a geographically remote may not be affected by whatever disaster may be befallen nearby gaming machines. Alternatively, gaming machines belonging to the nearest bank may be requested to store the backup. Alternatively still, one or more gaming machines within the nearest and the farthest bank may be requested to store the backup of the patron's meters. Other combinations are possible. As many or each of the gaming machines within the several banks may incorporate RAID, redundancy in the storage of the patron's meters is vastly increased. Indeed, in the event of a disk drive failure, it is likely that the mirroring that occurs in RAID will safeguard the patron's meters on any particular gaming machine. Even if a RAID fails and data pertaining to the patron's meters are lost on a particular gaming machine, the fact that those meters were previously backed up on multiple other gaming machines (some potentially offsite) and/or to a NAS further insures that the patron's meters will be maintained intact and available for further game play or cashout at any time.

According to one embodiment of the present invention, some or all of the gaming machines may be assigned one or more designated "buddy" gaming machine to which meter backup are preferentially made. The buddy gaming machine or gaming machines may belong to a single bank of gaming machines or buddies may be assigned across banks. Such buddy gaming machines each may include a RAID to receive and store backup meters across the communication network. When a meter backup is to be made, a gaming machine may signal its buddy or buddies across the communication network and store the patron's meters therein. A record may be kept of which buddy gaming machines accepted the backed up meters, to facilitate an eventual later retrieval thereof. For example, a gaming machine may be configured to backup its meters to a "near buddy" and/or to a "far buddy", meaning to a gaming machine that is geographically close or far to the gaming machine requesting the backup, respectively. Near or far buddies may belong to banks that are geographically close and far from the requesting gaming machine, respectfully.

In the event that the patron's current gaming machine is unable to retrieve or to modify the patron's meters stored within its RAID, the patron's current gaming machine may request that a copy thereof be retrieved and sent back from the gaming machine to which the meters were previously backed up. To do so, each gaming machine may maintain a record of the other gaming machines having accepted its backup meters and request a copy of the meters directly from that or those gaming machines, or the patron's gaming machine may broadcast a request for a copy of the meters associated with the patron's ID instrument, or associated with an identified gaming session, for example and thereafter pull the meters from a responding gaming machine or accept a copy of the meters pushed by one of the gaming machines to which the request was broadcast.

CONCLUSIONS

The described embodiments of the present inventions offer a simple distributed peer-to-peer metering of cashless game sessions that is secure, robust, scalable and that requires no central system. The incorporation of redundancy in the persistent storage within each gaming machine and frequent backups of the patron's meters further safeguards the integrity of the gaming sessions.

All the sensitive operations are carried out by the secure software (preferably certified by a recognized test laboratory such as GLI) that executes in each gaming machine. All the access points to any of the gaming terminals such as the cashier terminal or the automated cashier require only basic stateless client applications operating over a secure network protocol such as IPSec or SSL. Moreover, sophisticated relational databases are not required. Wireless laptops or palmtops may be advantageously used as entry or control terminals.

The invention supports all forms of cashless instruments such as:

- a player account whereby primary meters are the monetary credit balance associated to a patron ID;
- an anonymous game session account whereby primary meters are the monetary credit balance associated to a game session ID;
- a voucher verification account whereby the primary meters are the monetary value and the hash associated to the value amount and the encrypted signature printed or encoded on the voucher;
- a time gaming account whereby the primary meters are the time-to-play balance and the total of the winnings associated to a patron ID or to a game session ID;
- a smartcard reconciliation account whereby the primary meters are a mirrored copy of the meters managed in the secure electronic module of the smartcard.

The invention may be advantageously deployed for small to medium size game operators.

Although specific embodiments have been illustrated and described herein, it will be appreciated by those of skill in the art that any arrangement that is calculated to achieve the same purpose may be substituted for the specific embodiments shown. This application is intended to cover any adaptations or variations of the present invention.

What is claimed is:

1. A system of gaming machines, comprising:

a communication network;

a first gaming machine coupled to the communication network, the first gaming machine being configured to maintain meters associated with a patron's gaming session on the first gaming machine, the patron's gaming session including at least one game played on the first gaming machine, and a second gaming machine coupled to the communication network, the second gaming machine including a redundant array of independent disks (RAID), wherein the first gaming machine is configured to backup the meters associated with the patrons's gaming session in the first gaming machine to the RAID included in the second gaming machine directly over the communication network, and wherein the backup of the meters causes the meters associated with the patron's gaming session to remain stored on the first gaming machine and causes a copy of the meters associated with the patron's gaming session on the first gaming machine to be stored on the second gaming machine.

2. The system of gaming machines of claim 1, wherein the first gaming machine includes a RAID.

3. The system of gaming machines of claim 2, wherein the first gaming machine is a legacy gaming machine comprising a controller and further includes a PC within a locked enclosure thereof, the PC hems configured for communication with the network and the controller of the legacy machine, and for controlling the RAID.

4. The system of gaming machines of claim 1, wherein the first gaming machine is configured to backup the meters associated with the patron's gaming; session to the RAID included in the second gaming machine directly over the communication network upon occurrence of a predetermined event.

5. The system of gaming machines of claim 4, wherein the predetermined event is one of an elapsed period of time, an end of a currently played game, a change in the patron's meters, and the patron cashing out.

6. The system of gaming machines of claim 1, wherein the RAID is disposed within a locked enclosure of the second gaming machine.

7. The system of gaming machines of claim 1, wherein the first gaming machine is further configured to request the copy of the meters associated with the patron's gaming session from the second earning machine.

8. The system of gaming machines of claim 1, wherein the first gaming machine is further configured to maintain a record of the second gaming machines having accepted its backup meters.

9. The system of gaming machines of claim 1, wherein the first gaming machine is further configured to broadcast a request for a copy of the meters associated with the patron's gaming session over the communication network, and thereafter to one of:

receive a response from the second gaming machine and pull the copy of the meters associated with the patron's gaming session from the second gaming machine, and accept the copy of the meters associated with the patron's gaming session pushed by the second gaming machine.

10. A system of gaming machines, comprising:

a communication network;

plurality of gaming machines, each of the plurality of gaming machines being coupled to the communication network, the plurality of gaming machines being grouped in a plurality of banks of gaming machines, at least some of the plurality of gaming machines in each bank including a redundant array of independent disks (RAID), and wherein each gaming machine within each hank is configured to backup meters associated with a patron's gaming session to the RAID of at least one other gaming machine of a bank other than the bank to which the earning machine is grouped, and wherein the backup of the meters causes meters associated with the patron's gaming session to remain stored on a gaming machine on which the patron initiated the earning session, and causes a copy of the meters associated with the patron's gaming session to be stored on the RAID of the at least one other gaming machine.

11. The system of gaming machines of claim 10, wherein the banks of gaming machines are geographically separated from one another.

12. The system of gaming machines of claim 10, wherein the banks of gaming machines are defined according to logical parameters.

13. The system of gaming machines of claim 10, wherein each gaming machine within each hank of gamma machines is configured to backup meters to at least one predetermined preferred gaming machine within at least one bank other than the hank to which the gaming is grouped.

14. The system of gaming machines of claim 10, each gaming machine is further configured to request the backed up meters associated with the patron's gaming session from the least one other gaming machine to which the meters associated with the patron's gaming session were backed up.

15. The system of gaming machines of claim 10, wherein each gaming machine, is further configured to maintain a record of the at least one other gaming machine to which the meters associated with the patron's gaming session were backed up.

16. The system of gamine machines of claim 10, wherein each gaming machine is further configured to broadcast a request for the backed up meters associated with the patron's gaming Session over the communication on network, and thereafter to one of:

receive a response from a responding gaming machine and pull the backed up meters associated with the patron's gaming session from the responding gaming machine, and accept the backed up meters associated with the patron's gaming session pushed by a responding gaming machine.

* * * * *